United States Patent
Yuan et al.

(10) Patent No.: US 12,374,072 B2
(45) Date of Patent: Jul. 29, 2025

(54) CORRECTION METHOD AND APPARATUS FOR DEPTH IMAGE, AND METHOD FOR WELDING INSPECTION OF SHELL ASSEMBLY OF BATTERY

(71) Applicant: CONTEMPORARY AMPEREX TECHNOLOGY (HONG KONG) LIMITED, Hong Kong (CN)

(72) Inventors: Chao Yuan, Ningde (CN); Annan Shu, Ningde (CN); Guannan Jiang, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 205 days.

(21) Appl. No.: 18/361,916

(22) Filed: Jul. 31, 2023

(65) Prior Publication Data
US 2024/0062336 A1    Feb. 22, 2024

Related U.S. Application Data

(63) Continuation of application No. PCT/CN2023/082805, filed on Mar. 21, 2023.

(30) Foreign Application Priority Data

Aug. 19, 2022    (CN) .................. 202210998618.6

(51) Int. Cl.
*G06V 10/24* (2022.01)
*G06T 7/00* (2017.01)

(52) U.S. Cl.
CPC ............ *G06V 10/24* (2022.01); *G06T 7/0004* (2013.01); *G06T 2207/10028* (2013.01)

(58) Field of Classification Search
CPC ..... G06T 7/0002–001; G06T 7/50–596; G06T 2207/10012; G06T 2207/10021; G06T 2207/10028; G06V 10/24–248
See application file for complete search history.

(56) References Cited

U.S. PATENT DOCUMENTS

| | | | |
|---|---|---|---|
| 2023/0043697 A1* | 2/2023 | Yoshimoto | ................ G06T 7/13 |
| 2023/0139733 A1* | 5/2023 | Mo | .................... G01N 33/2045 |
| | | | 702/166 |

FOREIGN PATENT DOCUMENTS

| | | | |
|---|---|---|---|
| CN | 109813727 A | 5/2019 | |
| CN | 111462110 A | * 7/2020 | ......... G01N 21/8851 |

(Continued)

OTHER PUBLICATIONS

Rodríguez-Martín, Manuel, et al. "Feasibility study of a structured light system applied to welding inspection based on articulated coordinate measure machine data." IEEE Sensors Journal 17.13 (2017): 4217-4224. (Year: 2017).*

(Continued)

*Primary Examiner* — Geoffrey E Summers
(74) *Attorney, Agent, or Firm* — ANOVA LAW GROUP, PLLC

(57) ABSTRACT

A correction method for a depth image of a battery includes obtaining the depth image of the battery. The depth image includes two adjacent surfaces of a shell assembly of the battery and an intersecting line between the two adjacent surfaces. The method further includes extracting the intersecting line from the depth image, determining planes in the depth image in which the two adjacent surfaces are located, and obtaining a datum plane based on the intersecting line and the planes in which the two adjacent surfaces are located. The datum plane is parallel to the intersecting line, and included angles between the datum plane and the planes in which the two adjacent surfaces are located are equal to (Continued)

each other. The method also includes projecting and mapping points in the depth image to the datum plane, to obtain depth information of points in a corrected depth image.

10 Claims, 10 Drawing Sheets

(56) References Cited

FOREIGN PATENT DOCUMENTS

| CN | 111669557 | A | | 9/2020 | | |
|----|-----------|---|---|--------|---|---|
| CN | 111862181 | A | * | 10/2020 | ............. | G06T 7/521 |
| CN | 113042939 | A | | 6/2021 | | |
| CN | 113763350 | A | | 12/2021 | | |
| CN | 113936004 | A | | 1/2022 | | |
| CN | 114119464 | A | | 3/2022 | | |
| CN | 111968183 | B | | 4/2022 | | |
| JP | 2011011255 | A | | 1/2011 | | |
| TW | I572846 | B | | 3/2017 | | |

OTHER PUBLICATIONS

The World Intellectual Property Organization (WIPO) International Search Report for PCT/CN2023/082805 Jun. 19, 2023 5 pages (including English translation).
The China National Intellectual Property Administration (CNIPA) The Notice of the Granting of a Patent Right for an Invention for Chinese Application 202210998618.6 May 31, 2023 7 Pages (With Translation).
Shuwei Xing et al., "A projection-augmented system for in situ projection for mobile Carms", Dec. 2019, vol. 38 No. 6, Beijing Biomedical Engineeing.
The European Patent Office (EPO) The Extended European Search Report for Application No. 23735956.7 Oct. 25, 2024 8 Pages.

* cited by examiner

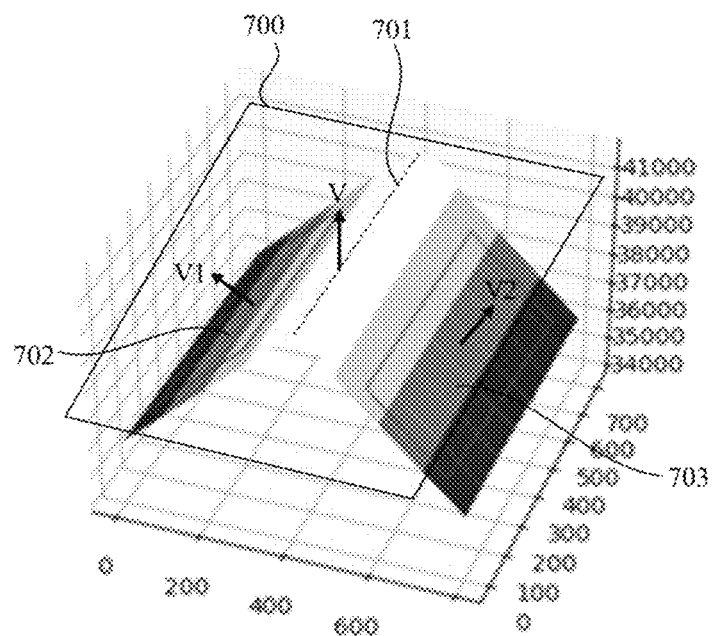
(a)
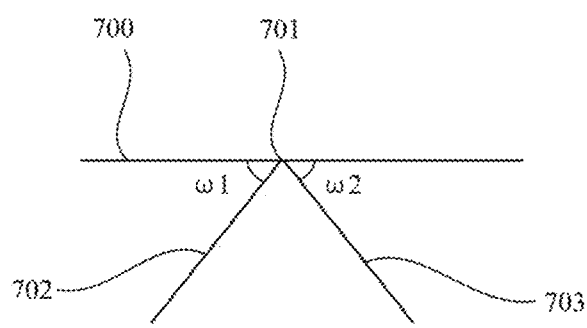
(b)
*FIG. 7*

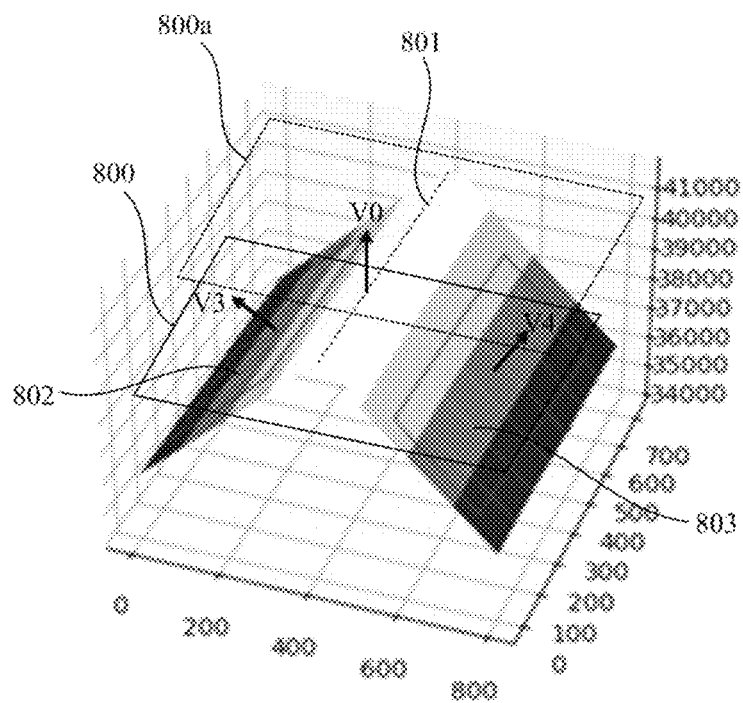
(a)
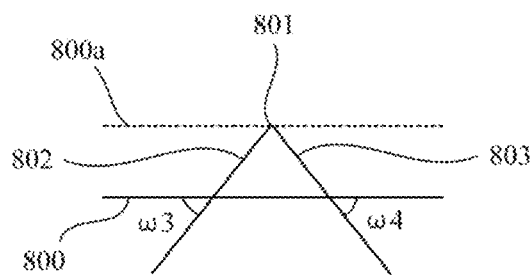
(b)
FIG. 8

1000

Obtain a depth image of a battery, where the depth image includes two adjacent surfaces of a shell assembly of the battery and an intersecting line between the two adjacent surfaces — 1001

Extract the intersecting line from the depth image — 1002

Determine planes in the depth image in which the two adjacent surfaces are located — 1003

Obtain a datum plane based on the intersecting line and the planes in which the two adjacent surfaces are located, where the datum plane is parallel to the intersecting line, and included angles between the datum plane and the planes in which the two adjacent surfaces are located are equal to each other — 1004

Project and map points in the depth image to the datum plane, to obtain depth information of points in a corrected depth image — 1005

FIG. 10

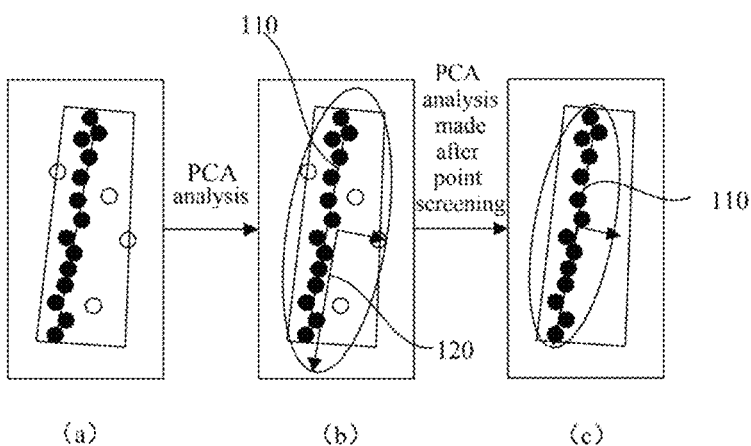

FIG. 11

CORRECTION METHOD AND APPARATUS FOR DEPTH IMAGE, AND METHOD FOR WELDING INSPECTION OF SHELL ASSEMBLY OF BATTERY

CROSS-REFERENCE TO RELATED APPLICATIONS

The present application is a continuation of International Application No. PCT/CN2023/082805, filed on Mar. 21, 2023, which claims priority to Chinese patent application no. 202210998618.6, filed on Aug. 19, 2022 and entitled "CORRECTION METHOD AND APPARATUS FOR DEPTH IMAGE, AND METHOD FOR WELDING INSPECTION OF SHELL ASSEMBLY OF BATTERY", which are incorporated herein by reference in their entirety.

TECHNICAL FIELD

The present application relates to the technical field of batteries, and in particular to a correction method and apparatus for a depth image of a battery, a method for welding inspection of a shell assembly of a battery, a control apparatus, a computer-readable storage medium, and a computer program product.

BACKGROUND ART

A shell assembly of a battery is generally formed by welding between two parts, and after a welding process, welding quality is generally inspected using an image, in which the detection of many defects depends on depth information from a depth image. However, due to hardware factors of a camera, human errors in mounting, changes in a photographing environment on site, etc., the camera may have a photographing state deviated from a desired index, causing certain errors in the depth image, which errors may seriously affect the accuracy of defect detection results.

SUMMARY

The present application is intended to solve at least one of the technical problems existing in some cases. To this end, an objective of the present application is to propose a correction method and apparatus for a depth image of a battery, a method for welding inspection of a shell assembly of a battery, a control apparatus, a computer-readable storage medium, and a computer program product, to remove deviations in an image during inspection, thereby improving the accuracy of inspection results for a shell assembly of a battery.

An embodiment in a first aspect of the present application provides a correction method for a depth image of a battery, including: obtaining a depth image of a battery, where the depth image includes two adjacent surfaces of a shell assembly of the battery and an intersecting line between the two adjacent surfaces; extracting the intersecting line from the depth image; determining planes in the depth image in which the two adjacent surfaces are located; obtaining a datum plane based on the intersecting line and the planes in which the two adjacent surfaces are located, where the datum plane is parallel to the intersecting line, and included angles between the datum plane and the planes in which the two adjacent surfaces are located are equal to each other; and projecting and mapping points in the depth image to the datum plane, to obtain depth information of points in a corrected depth image.

In the technical solution of this embodiment of the present application, a datum plane is fitted based on the depth image of the shell assembly of the battery, and the depth information of the depth image is corrected by taking the datum plane as the standard, such that deviations in the depth image caused by the deviation of a photographing state of a camera from a desired index can be avoided, which facilitates inspection of the shell assembly of the battery based on the image, and can improve the accuracy of inspection results for the shell assembly of the battery.

Moreover, in this embodiment, the fitted datum plane is parallel to the intersecting line, and the included angles between the datum plane and the two adjacent surfaces are equal to each other. In this way, both the intersecting line and the two adjacent surfaces in the depth image can be projected to the datum plane, such that the entire depth image can be corrected to obtain a fully corrected image of the shell assembly of the battery, for use in inspecting the shell assembly. In addition, in this embodiment, the datum plane is simple in terms of algorithm, which facilitates reducing the amount of computation and improving the efficiency of computation.

In some embodiments, the extracting the intersecting line from the depth image includes: extracting a point with the largest depth value in each row from the depth image; and obtaining an equation of a straight line for the intersecting line based on extracted points.

According to this embodiment, the process of extracting the intersecting line is simple, and the obtained equation for the intersecting line is relatively accurate. Therefore, a datum plane obtained based on the intersecting line can also be made relatively reliable, which facilitates improving the accuracy of correcting the depth image based on the datum plane.

In some embodiments, the obtaining an equation of a straight line for the intersecting line based on extracted points includes: analyzing the extracted points by using a principal component analysis algorithm to obtain feature vectors, and obtaining the equation of the straight line based on the feature vectors.

According to this embodiment, the equation of the straight line for the intersecting line is simple in terms of calculation mode, and the obtained equation for the intersecting line is relatively accurate. Therefore, a datum plane obtained based on the intersecting line can also be made relatively reliable, which facilitates improving the accuracy of correcting the depth image based on the datum plane.

In some embodiments, the extracting the intersecting line from the depth image further includes: determining whether the equation of the straight line meets a set condition, and if not, performing screening on the extracted points, and re-obtaining an equation of a straight line based on points remained after screening.

According to this embodiment, feature points can be further refined such that the accuracy of the feature points can be improved, and the accuracy of a fitted intersecting line can thus be improved.

In some embodiments, the obtaining a datum plane based on the intersecting line and the planes in which the two adjacent surfaces are located includes: calculating feature vectors of the planes in which the two adjacent surfaces are located; and obtaining an equation for the datum plane based on the feature vectors of the planes in which the two adjacent surfaces are located and the equation of the straight line in which the intersecting line is located, where a normal vector to the datum plane is a sum of the feature vectors of the planes in which the two adjacent surfaces are located.

In this embodiment, the datum plane is simple in terms of calculation mode, which facilitates reducing the amount of computation and improving the efficiency of computation.

In some embodiments, the determining planes in the depth image in which the two adjacent surfaces are located includes: determining the planes in which the two adjacent surfaces are located based on the equation of the straight line in which the intersecting line is located.

According to this embodiment, the planes in which the two surfaces are located can be obtained more easily, thereby further simplifying the entire depth image correction algorithm.

An embodiment in a second aspect of the present application provides a method for welding inspection of a shell assembly of a battery, including: acquiring a depth image of a battery, where the battery includes a shell assembly, the shell assembly includes a first portion and a second portion connected to each other by means of welding, the depth image includes two adjacent surfaces of the shell assembly of the battery and an intersecting line between the two adjacent surfaces, and there is a weld bead for the first portion and the second portion on at least one of the two adjacent surfaces; correcting the depth image of the battery by using a correction method for a depth image of a battery of any one of the embodiments described above, to obtain depth information of points in a corrected depth image; and determining a quality of the weld bead based on the depth information of the points in the corrected depth image.

In the technical solution of the present application, the depth image of the shell assembly of the battery is corrected such that deviations in the depth image caused by the deviation of a photographing state of a camera from a desired index can be avoided, which facilitates inspection of a weld bead of the shell assembly of the battery, and can improve the accuracy of inspection results for the weld bead of the shell assembly of the battery.

In some embodiments, the acquiring a depth image of a battery includes: photographing the depth image of the battery by a depth camera, where an image acquisition plane of the depth camera forms an inclination angle θ with at least one of the two adjacent surfaces of the shell assembly of the battery, and the inclination angle θ satisfies 30°≤θ≤60°.

In this embodiment, when the inclination angle θ satisfies 30°≤θ≤60°, it is conducive to taking both of the two adjacent surfaces into account, such that both of the two surfaces are photographed and acquired, and both of the acquired two surfaces are subjected to a relatively small image distortion, which facilitates inspection and analysis of feature information on the two surfaces.

An embodiment in a third aspect of the present application provides a correction apparatus for a depth image of a battery, including: an obtaining module configured to obtain a depth image of a battery, where the depth image includes two adjacent surfaces of a shell assembly of the battery and an intersecting line between the two adjacent surfaces; an intersecting line extraction module configured to extract the intersecting line from the depth image; a surface determination module configured to determine planes in the depth image in which the two adjacent surfaces are located; a datum plane generation module configured to obtain a datum plane based on the intersecting line and the planes in which the two adjacent surfaces are located, where the datum plane is parallel to the intersecting line, and included angles between the datum plane and the planes in which the two adjacent surfaces are located are equal to each other; and a mapping module configured to project and map points in the depth image to the datum plane, to obtain depth information of points in a corrected depth image.

In the technical solution of the present application, a datum plane is fitted based on the depth image of the shell assembly of the battery, and the depth information of the depth image is corrected by taking the datum plane as the standard, such that deviations in the depth image caused by the deviation of a photographing state of a camera from a desired index can be avoided, which facilitates inspection of the shell assembly of the battery based on the image, and can improve the accuracy of inspection results for the shell assembly of the battery.

Moreover, in this embodiment, the fitted datum plane is parallel to the intersecting line, and the included angles between the datum plane and the two adjacent surfaces are equal to each other. In this way, both the intersecting line and the two adjacent surfaces in the depth image can be projected to the datum plane, such that the entire depth image can be corrected to obtain a fully corrected image of the shell assembly of the battery, for use in inspecting the shell assembly. In addition, in this embodiment, the datum plane is simple in terms of algorithm, which facilitates reducing the amount of computation and improving the efficiency of computation.

In some embodiments, the intersecting line extraction module is configured to: extract a point with the largest depth value in each row from the depth image; and obtain an equation of a straight line for the intersecting line based on extracted points.

According to this embodiment, the process of extracting the intersecting line is simple, and the obtained equation for the intersecting line is relatively accurate. Therefore, a datum plane obtained based on the intersecting line can also be made relatively reliable, which facilitates improving the accuracy of correcting the depth image based on the datum plane.

In some embodiments, the intersecting line extraction module is configured to: analyze the extracted points by using a principal component analysis algorithm to obtain feature vectors, and obtain the equation of the straight line based on the feature vectors.

According to this embodiment, the equation of the straight line for the intersecting line is simple in terms of calculation mode, and the obtained equation for the intersecting line is relatively accurate. Therefore, a datum plane obtained based on the intersecting line can also be made relatively reliable, which facilitates improving the accuracy of correcting the depth image based on the datum plane.

In some embodiments, the intersecting line extraction module is further configured to: determine whether the equation of the straight line meets a set condition, and if not, perform screening on the extracted points, and re-obtain an equation of a straight line based on points remained after screening.

According to this embodiment, feature points can be further refined such that the accuracy of feature points at the top edge can be improved, and the accuracy of a fitted intersecting line can thus be improved.

In some embodiments, the datum plane generation module is configured to: calculate feature vectors of the planes in which the two adjacent surfaces are located; and obtain an equation for the datum plane based on the feature vectors of the planes in which the two adjacent surfaces are located and the equation of the straight line in which the intersecting line is located, where a normal vector to the datum plane is a sum of the feature vectors of the planes in which the two adjacent surfaces are located.

In this embodiment, the datum plane is simple in terms of calculation mode, which facilitates reducing the amount of computation and improving the efficiency of computation.

In some embodiments, the surface determination module is configured to: determine the planes in which the two adjacent surfaces are located based on the equation of the straight line in which the intersecting line is located.

According to this embodiment, the planes in which the two surfaces are located can be obtained more easily, thereby further simplifying the entire depth image correction algorithm.

An embodiment in a fourth aspect of the present application provides a control apparatus, including: at least one processor; and a memory communicatively coupled to the at least one processor, where the memory stores instructions executable by the at least one processor, and the instructions, when executed by the at least one processor, cause the at least one processor to perform a correction method for a depth image of a battery of any one of the embodiments described above.

An embodiment in a fifth aspect of the present application provides a computer-readable storage medium storing a computer program that, when executed by a processor, implements a correction method for a depth image of a battery of any one of the embodiments described above.

An embodiment in a sixth aspect of the present application provides a computer program product including a computer program that, when executed by a processor, implements a correction method for a depth image of a battery of any one of the embodiments described above.

The above description is only an overview of the technical solutions of the present application. In order to more clearly understand the technical means of the present application to implement same according to the contents of the description, and in order to make the above and other objectives, features and advantages of the present application more obvious and understandable, specific implementations of the present application are exemplarily described below.

BRIEF DESCRIPTION OF THE DRAWINGS

In the accompanying drawings, the same reference numerals denote the same or similar parts or elements throughout a plurality of drawings unless otherwise specified. These drawings are not necessarily drawn to scale. It should be understood that these drawings depict only some embodiments according to the present application herein and are not to be construed as limiting the scope of the application. In order to illustrate the technical solutions of the embodiments of the present application more clearly, the accompanying drawings required in the description of the embodiments of the present application will be described briefly below. Obviously, the accompanying drawings described below are merely some embodiments of the present application, and for those of ordinary skill in the art, other accompanying drawings can also be obtained from these accompanying drawings without any creative efforts.

FIG. 7 is a schematic diagram of obtaining a datum plane based on an intersecting line and planes in which two adjacent surfaces are located, according to some embodiments of the present application;

FIG. 8 is a schematic diagram of obtaining a datum plane based on an intersecting line and planes in which two adjacent surfaces are located, according to some other embodiments of the present application;

FIG. 10 is a flowchart of a correction method for a depth image of a battery according to some embodiments of the present application;

FIG. 11 is a schematic diagram of the principle of extracting an intersecting line from a depth image according to some embodiments of the present application;

LIST OF REFERENCE NUMERALS

Figure 1:
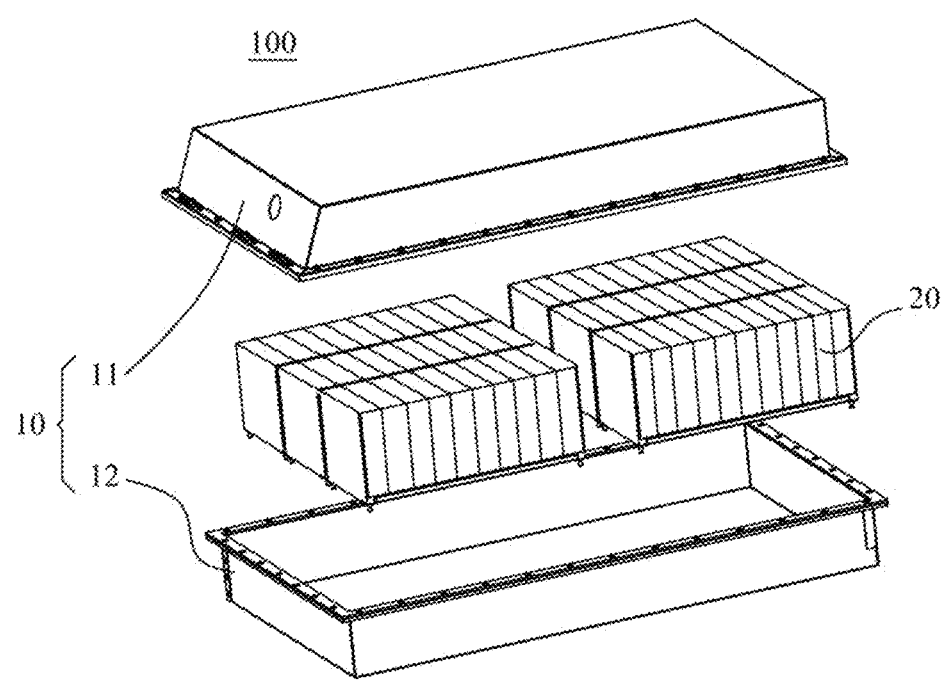
FIG. 1 is a schematic exploded structural diagram of a battery according to some embodiments of the present application.

Battery 100, Case 10, First case portion 11, Second case portion 12;
Battery cell 20, First portion 21, Second portion 22, Electrode terminal 21*a*, Cell assembly 23;
Shell assembly 30 and 40, Top cover 31, Shell 32;
Intersecting line 301*a*, 301*b*, 301*c*, 301*d*, 401, 501, 601, 701, 801, and 110;
Weld bead 302*a*, 302*b*, 302*c*, and 302*d*, CCD line scan camera 41, Image acquisition plane 410;
Two adjacent surfaces 502 and 503;
Planes 602, 603, 702, 703, 802, 803 in which two adjacent surfaces are located;
Datum plane 700, 800, and 900, Plane 800*a*;
Correction apparatus 1400 for depth image of battery, Obtaining module 1401, Intersecting line extraction module 1402;
Surface determination module 1403, Datum plane generation module 1404, Mapping module 1405.

DETAILED DESCRIPTION OF EMBODIMENTS

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: only A exists, both A and B exist, and only B exists. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front"; "rear", "left", "right", "vertical", "horizontal", "top", "bottom", "inner", "outer", "clockwise", "counterclockwise", "axial", "radial", "circumferential", etc. are based on the orientation or position relationship shown in the accompanying drawings and are merely intended to facilitate and simplify the description of the embodiments of the present application, rather than indicating or implying that the apparatus or element considered must have a particular orientation or be constructed and operated in a particular orientation, and therefore not to be construed as limiting the embodiments of the present application.

In the description of the embodiments of the present application, unless otherwise explicitly specified and defined, the technical terms such as "install", "couple", "connect", and "fix" should be understood in a broad sense, for example, they may be a fixed connection, a detachable connection, or an integrated connection; may be a mechanical connection or an electric connection; and may be a direct connection or an indirect connection by means of an intermediate medium, or may be communication between interiors of two elements or interaction between the two elements. For those of ordinary skill in the art, the specific meanings of the above terms in the embodiments of the present application can be understood according to specific situations.

At present, from the perspective of the development of the market situation, traction batteries are used more and more widely. The traction batteries are not only used in energy storage power systems such as hydroelectric power plants, thermal power plants, wind power plants and solar power plants, but also widely used in electric transportation means such as electric bicycles, electric motorcycles, and electric vehicles and in many fields such as military equipment and aerospace. With the continuous expansion of the application field of traction batteries, the market demand for the traction batteries is also expanding.

A traction battery includes battery cells. The applicants have noted that a shell assembly of a battery cell is generally formed by connecting two parts (such as a shell and a top cover) by means of welding, and after a welding process, welding quality is generally inspected using an image, in which the detection of many defects depends on depth information from a depth image.

The applicants have found after research that due to hardware factors of a camera, human errors in mounting, changes in a photographing environment on site, etc., the camera may have a photographing state deviated from a desired index, causing certain errors in the depth image, which errors may seriously affect the accuracy of defect detection results.

For example, when the shell assembly is photographed by a depth camera, it is desirable that an image acquisition plane of the depth camera is parallel to a weld bead, because this facilitates inspecting the quality of the weld bead based on a machine learning method, thereby improving the accuracy of quality inspection of the weld bead. However, during actual operations, a camera is prone to an angular deviation, resulting in deviations in depth information of a depth image, and thus making it difficult to accurately determine the welding quality of a weld bead. For example, due to inaccurate position calibration of the camera, the weld bead in the depth image has an extension direction that is deviated, and consequently, the weld bead has an increasingly larger depth value along its extension direction, making it difficult to accurately determine the welding quality of the weld bead.

In view of the above considerations, the applicants made intensive studies and have designed a correction method and apparatus for a depth image of a battery, a method for welding inspection of a shell assembly of a battery, a control apparatus, a computer-readable storage medium, and a computer program product, in order to solve the problem of deviations in the depth image of the battery during acquisition, thereby improving the accuracy of results for inspection of the shell assembly of the battery based on the image. In the present application, the depth information of the acquired depth image of the battery is corrected, and the corrected depth information is used to inspect the quality of the shell assembly of the battery, such that the problems of a relatively low accuracy of quality inspection caused by the deviations in the image during acquisition, etc. can be avoided, making quality inspection results more accurate.

The battery cell disclosed in the embodiments of the present application may be used in, but is not limited to, a power consuming apparatus, such as a vehicle, a ship, or an aircraft. A power system composed of the battery cells, batteries, etc. disclosed in the present application may be used for the power consuming apparatus, which is conducive to avoiding safety problems caused by poor welding of the top cover of the battery cell, thereby improving the performance stability and service life of the battery.

Referring to FIG. 1, FIG. 1 is an exploded view of the battery 100 provided in some embodiments of the present application. The battery 100 includes a case 10 and battery cells 20. The battery cells 20 are accommodated in the case 10. The case 10 is configured to provide an accommodation space for the battery cells 20, and the case 10 may be of various structures. In some embodiments, the case 10 may include a first case portion 11 and a second case portion 12. The first case portion 11 and the second case portion 12 are fitted to each other in a covered manner, and the first case portion 11 and the second case portion 12 jointly define the accommodation space for accommodating the battery cell 20. The second case portion 12 may be of a hollow structure with one end open, the first case portion 11 may be of a plate-like structure, and the first case portion 11 is fitted to the open side of the second case portion 12 in a covered manner, such that the first case portion 11 and the second case portion 12 jointly define the accommodation space; and the first case portion 11 and the second case portion 12 each may also be of a hollow structure with one side open, and the open side of the first case portion 11 is fitted to the open side of the second case portion 12 in a covered manner. Of course, the case 10 formed by the first case portion 11 and the second case portion 12 may be of various shapes, such as a cylinder and a cuboid.

In the battery 100, a plurality of battery cells 20 may be provided. The plurality of battery cells 20 may be connected in series, in parallel, or in series and parallel. The parallel-series connection means that the plurality of battery cells 20 are connected both in series and in parallel. The plurality of battery cells 20 may be directly connected together in series, or in parallel, or in series-parallel, and then a unit composed of the plurality of battery cells 20 is accommodated inside the case 10. Of course, the battery 100 may also be a unit accommodated in the case 10 that is formed by firstly connecting the plurality of battery cells 20 in series or in parallel or in series and parallel to battery modules, and then connecting the plurality of battery modules in series or in parallel or in series and parallel. The battery 100 may further include other structures. For example, the battery 100 may further include a busbar component for achieving electrical connections between the plurality of battery cells 20.

Each battery cell 20 may be a secondary battery or a primary battery, and may also be a lithium-sulfur battery, a sodium-ion battery, or a magnesium-ion battery, but is not limited thereto.

Figure 2:
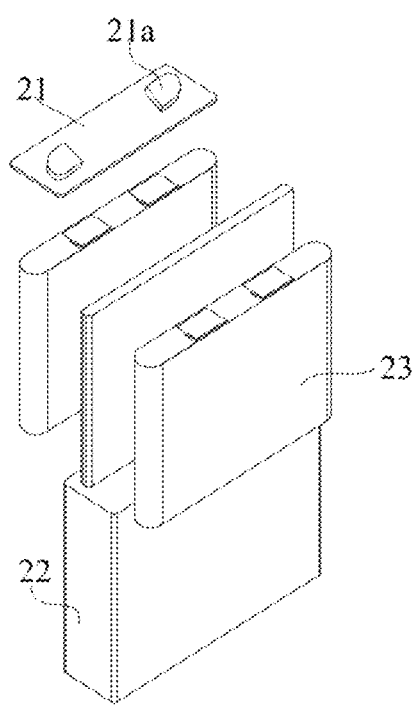
FIG. 2 is a schematic exploded structural diagram of a battery cell according to some embodiments of the present application.

Referring to FIG. 2, FIG. 2 is a schematic exploded structural diagram of the battery cell 20 according to some embodiments of the present application. The battery cell 20 refers to the smallest unit of the battery. As shown in FIG. 2, the battery cell 20 includes a shell assembly and a cell assembly 23 located in the shell assembly. The shell assembly includes a first portion 21 and a second portion 22.

As shown in FIG. 2, the first portion 21 of the shell assembly may be a top cover that can be fitted to an opening of the second portion 22 in a covered manner, to isolate an internal environment of the battery cell 20 from an external environment. Without limitation, the first portion 21 may be shaped to adapt to the shape of the second portion 22 so as to fit with the second portion 22. Optionally, the first portion 21 may be made of a material (e.g., aluminum alloy) with a certain hardness and strength, and thus the first portion 21 would not easily deform when being squeezed or collided, such that the battery cell 20 can have a higher structural strength, and the safety performance can also be improved. The first portion 21 may be provided with functional components such as electrode terminals 21a. The electrode terminals 21a may be used for electrical connection to the cell assembly 23 for outputting or inputting electrical energy of the battery cell 20. In some embodiments, the first portion 21 may further be provided with a pressure relief mechanism, which is configured to release an internal pressure when the internal pressure or temperature of the battery cell 20 reaches a threshold. The first portion 21 may also be made of various materials, such as copper, iron, aluminum, stainless steel, aluminum alloy, and plastic, which is not specially limited in the embodiments of the present application. In some embodiments, the first portion 21 may further be provided with an insulating member on an inner side. The insulating member may be configured to isolate electrical connection components inside the second portion 22 from the first portion 21, in order to reduce the risk of a short circuit. Exemplarily, the insulating member may be made of plastic, rubber, etc.

The second portion 22 of the shell assembly may be a shell that is configured to fit with the first portion 21 to form the internal environment of the battery cell 20, where the formed internal environment may be used for accommodating the cell assembly 23, an electrolyte, and other components. The second portion 22 and the first portion 21 may be independent components, and the second portion 22 may be provided with an opening, at which the first portion 21 is fitted to the opening in a covered manner, to form the internal environment of the battery cell 20. Without limitation, the first portion 21 and the second portion 22 may also be integrated. Specifically, the first portion 21 and the second portion 22 may firstly form a common connecting surface before other components are placed into the shell, and then the first portion 21 is fitted to the second portion 22 in a covered manner when the interior of the second portion 22 needs to be packaged. The second portion 22 may be made of various materials, such as copper, iron, aluminum, stainless steel, aluminum alloy, and plastic, which is not specially limited in the embodiments of the present application.

Figure 3:
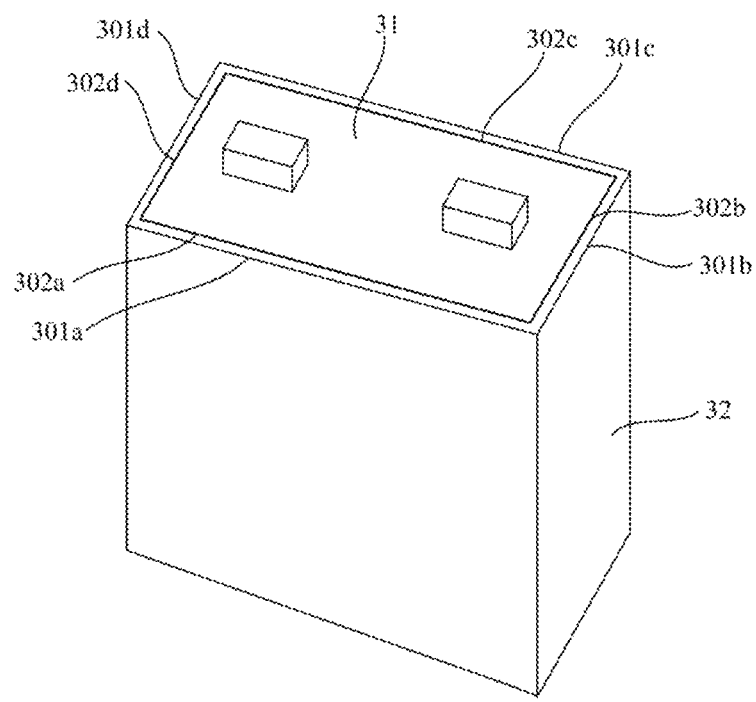
FIG. 3 is a schematic structural diagram of a battery cell according to some embodiments of the present application.

Referring to FIG. 3, FIG. 3 is a schematic structural diagram of a battery cell according to some embodiments of the present application. As shown in FIG. 3, a shell assembly 30 is formed by connecting a shell 32 and a top cover 31 by means of welding. The shell assembly 30 is prismatic, for example, rectangular, which specifically includes a top surface, a bottom surface, and a plurality of sides. The top surface is the surface where the top cover 31 is located, there are a plurality of intersecting lines between the top surface and the plurality of sides of the shell assembly 30, and the plurality of intersecting lines surround the top surface.

A plurality of weld beads are formed by welding between the shell 32 and the top cover 31, and each weld bead is close to one intersecting line of the shell assembly 30 and substantially parallel to the intersecting line. As shown in FIG. 3, with a rectangular shell assembly 30 as an example, the top surface of the shell assembly 30 forms four intersecting lines 301a, 301b, 301c, and 301d with the four sides of the shell assembly, respectively, four weld beads 302a, 302b, 302c, and 302d are formed by welding between the shell 32 and the top cover 31, and each weld bead is close to one intersecting line of the shell assembly 30 and substantially parallel to the intersecting line. For example, the intersecting line 301a is close to the weld bead 302a and substantially parallel to the weld bead 302a, the intersecting line 301b is close to the weld bead 302b and substantially parallel to the weld bead 302b, the intersecting line 301c is close to the weld bead 302c and substantially parallel to the weld bead 302c, and the intersecting line 301d is close to the weld bead 302d and substantially parallel to the weld bead 302d. When welding inspection is performed on the shell assembly, a depth camera is generally used to photograph each weld bead and obtain a corresponding depth image, and the quality of each weld bead is determined through the corresponding depth image.

Figure 4:
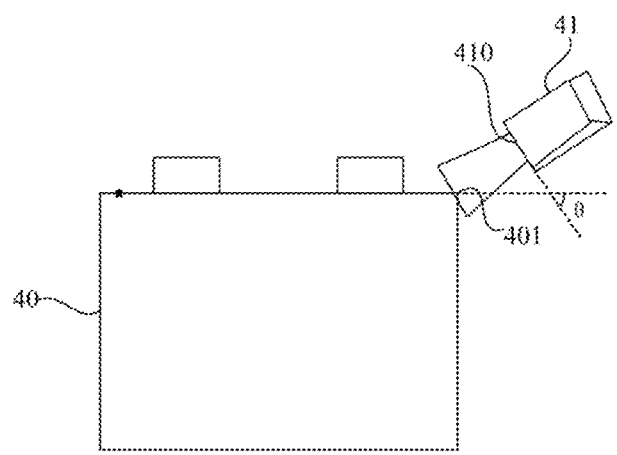
FIG. 4 is a schematic diagram of a process of acquiring an image of a shell assembly of a battery by a depth camera according to some embodiments of the present application.

Referring to FIG. 4, FIG. 4 is a schematic diagram of a process of acquiring an image of a shell assembly 40 of a battery by a depth camera according to some embodiments of the present application. For example, as shown in FIG. 4, in some embodiments, a CCD line scan camera 41 is used to acquire a depth image of the shell assembly 40 of the battery. The CCD line scan camera 41 performs scanning along one intersecting line 401 of the shell assembly 40 to obtain the depth image of the shell assembly 40. The depth image of the shell assembly 40 that is obtained after scanning includes the intersecting line 401 and two surfaces adjacent to the intersecting line 401. For example, the two surfaces in FIG. 4 are respectively one top surface and one side of the shell assembly.

Figure 5:
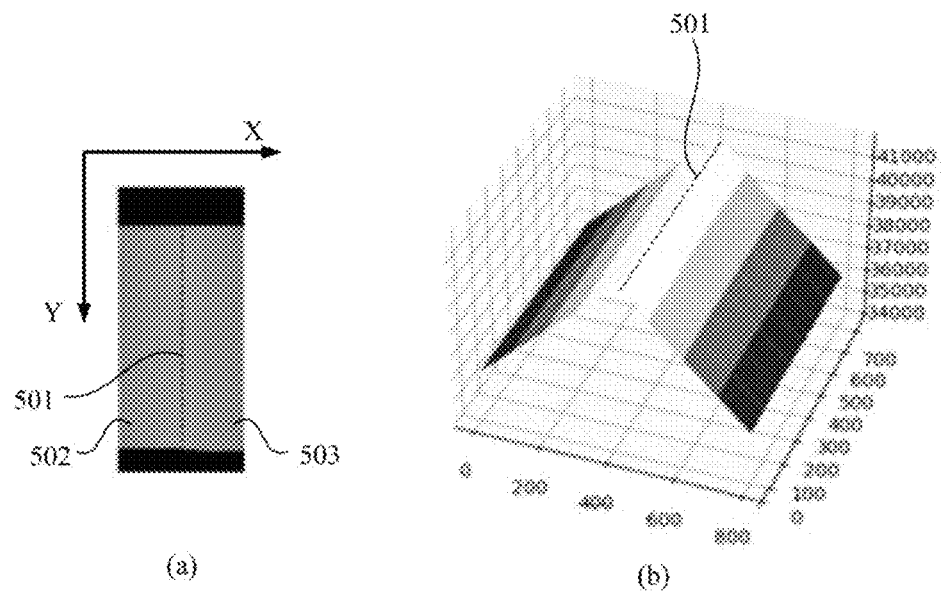
FIG. 5 is a schematic diagram of a depth image of a shell assembly of a battery that is acquired by a depth camera, according to some embodiments of the present application.

The depth image of the shell assembly that is obtained through scanning by using the method of FIG. 4 may be as shown in FIG. 5. (a) of FIG. 5 is a depth image of the shell assembly of the battery that is acquired by a depth camera, which is similar to a grayscale image. In the depth image, each pixel value is an actual distance of a sensor from an object, which is specifically represented in grayscale. (b) of FIG. 5 is a schematic diagram of a three-dimensional computer graphics corresponding to the depth image (a). In the three-dimensional computer graphics, the depth image is an image or image channel that contains information about a distance from a surface of a scene object of a viewpoint. The depth image in FIG. 5 includes one intersecting line 501 of the shell assembly and two surfaces 502 and 503 adjacent to the intersecting line 501.

Figure 6:
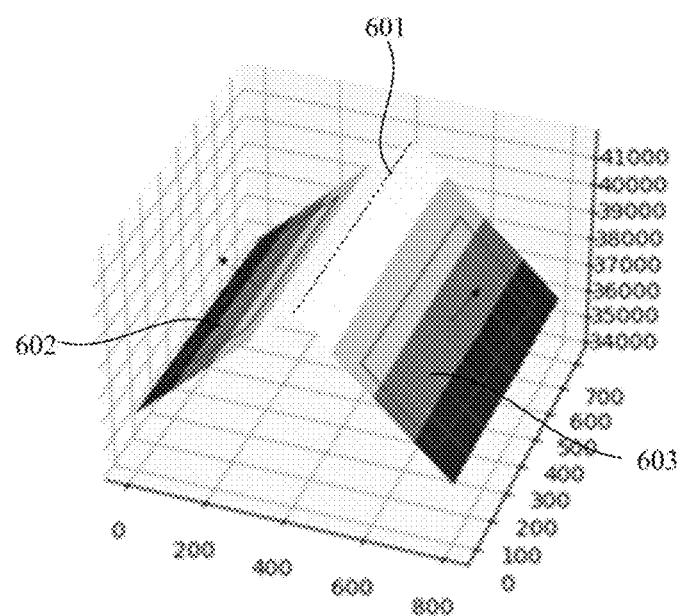
FIG. 6 is a schematic diagram of extracting an intersecting line from a depth image and determining planes in which two adjacent surfaces are located, according to some embodiments of the present application.
Figure 9:
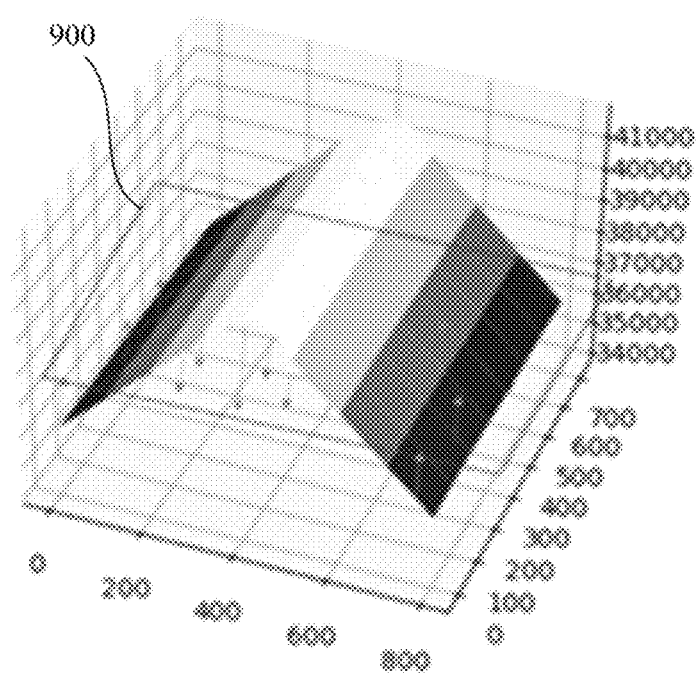
FIG. 9 is a schematic diagram of projecting points in a depth image to a datum plane according to some embodiments of the present application.

Referring to FIGS. 5, 6, 7, 8, 9, and 10, FIG. 10 is a flowchart 1000 of a correction method for a depth image of a battery according to some embodiments of the present application. FIGS. 6 to 9 are schematic diagrams of a process of correcting a depth image of a battery according to some embodiments of the present application. FIG. 6 is a schematic diagram of extracting an intersecting line from a depth image and determining planes in which two adjacent surfaces are located, according to some embodiments of the present application; FIG. 7 is a schematic diagram of obtaining a datum plane based on an intersecting line and planes in which two adjacent surfaces are located, according to some embodiments of the present application; FIG. 8 is a schematic diagram of obtaining a datum plane based on an intersecting line and planes in which two adjacent surfaces are located, according to some other embodiments of the present application; and FIG. 9 is a schematic diagram of projecting points in a depth image to a datum plane according to some embodiments of the present application.

Some embodiments in a first aspect of the disclosure provide a correction method for a depth image of a battery. As shown in FIG. 10, the method includes the following steps.

In S1001, a depth image of a battery is obtained, where the depth image includes two adjacent surfaces of a shell assembly of the battery and an intersecting line between the two adjacent surfaces.

Exemplarily, in FIG. 4, for example, the depth image of the shell assembly 40 of the battery can be obtained by the CCD line scan camera 41 by performing scanning. Specifically, the depth image can be obtained by performing scanning along the intersecting line 401 between the two adjacent surfaces of the shell assembly 40. The depth image obtained through scanning may be as shown in (a) and (b) of FIG. 5, in which the two adjacent surfaces 502 and 503 of the shell assembly and the intersecting line 501 between the two surfaces 502 and 503 are included.

Next, the obtained depth image is corrected through the following steps.

In S1002, the intersecting line is extracted from the depth image.

As shown in FIG. 6, in the depth image, points on an intersecting line 601 tend to be higher than other points, and thus the intersecting line 601 is easily extracted therefrom based on the depth image.

In S1003, planes in the depth image in which the two adjacent surfaces are located are determined.

For example, as shown in FIG. 6, two surfaces in the depth image are located on either side of the intersecting line 601, and points on the two surfaces tend to be lower than the points on the intersecting line 601. Therefore, the two surfaces and planes 602 and 603 in which the two surfaces are respectively located are also easily determined based on the depth image.

In S1004, a datum plane is obtained based on the intersecting line and the planes in which the two adjacent surfaces are located, where the datum plane is parallel to the intersecting line, and included angles between the datum plane and the planes in which the two adjacent surfaces are located are equal to each other.

With a datum plane 700 shown in FIG. 7 as an example, FIG. 7(a) shows a relative positional relationship of an intersecting line 701, two adjacent surfaces, and the datum plane 700 in a three-dimensional space, and FIG. 7(b) shows a schematic diagram of a cross-section perpendicular to the intersecting line 701 and the datum plane 700. As shown in FIGS. 7(a) and 7(b), the intersecting line 701 is parallel to the datum plane 700 and is located within the datum plane 700, the two adjacent surfaces are respectively located in planes 702 and 703, and an included angle ω1 between the datum plane 700 and the plane 702 is equal to an included angle ω2 between the datum plane 700 and the plane 703. According to this relative positional relationship, the datum plane 700 can be obtained based on the intersecting line 701 and the planes 702 and 703 in which the two surfaces are located.

With a datum plane 800 shown in FIG. 8 as an example, FIG. 8(a) shows a relative positional relationship of an intersecting line 801, two adjacent surfaces, and the datum plane 800 in a three-dimensional space, and FIG. 8(b) shows a schematic diagram of a cross-section perpendicular to the intersecting line 801 and the datum plane 800. As shown in FIGS. 8(a) and 8(b), the datum plane 800 is parallel to, that is, does not intersect with the intersecting line 801, the two adjacent surfaces are respectively located in planes 802 and 803, and an included angle ω3 between the datum plane 800 and the plane 802 is equal to an included angle ω4 between the datum plane 800 and the plane 803. According to this relative positional relationship, a plane 800a including the intersecting line 801 can first be obtained based on the intersecting line 801 and the planes 802 and 803 in which the two surfaces are located, and then the datum plane 800 can be obtained by adjusting a constant value of the plane 800a.

In S1005, points in the depth image are projected and mapped to the datum plane, to obtain depth information of points in a corrected depth image.

The depth information of the points in the corrected depth image is a height value by which the points in the depth image are projected and mapped to the datum plane. For example, in FIG. 9, each line segment with an arrow in FIG. 9 represents a process of projecting one point in the depth image to a datum plane 900, and the length of each line segment with an arrow is a height value by which one point in the depth image is projected and mapped to the datum plane 900, that is, depth information of one point in the corrected depth image.

Exemplarily, all the points in the depth image may be projected and mapped to the datum plane to obtain corrected depth information for all the points, or only points in some regions may be projected and mapped to the datum plane to obtain corrected depth information for the points in some regions. For example, points in some regions including a weld bead are projected and mapped to the datum plane to obtain depth information for the points in some regions including the weld bead, for use in determining the quality of the weld bead. This can be specifically determined according to actual requirements.

In the technical solution of the present application, a datum plane is fitted based on the depth image of the shell assembly of the battery, and the depth information of the depth image is corrected by taking the datum plane as the standard, such that deviations in the depth image caused by the deviation of a photographing state of a camera from a desired index can be avoided, which facilitates inspection of the shell assembly of the battery based on the image, and can improve the accuracy of inspection results for the shell assembly of the battery, for example, facilitating determinations of the quality of the weld bead of the shell assembly based on a machine learning method and improving the accuracy of determination results.

Moreover, in this embodiment, the fitted datum plane is parallel to the intersecting line, and the included angles between the datum plane and the two adjacent surfaces are equal to each other. In this way, both the intersecting line and the two adjacent surfaces in the depth image can be projected to the datum plane, such that the entire depth image can be corrected to obtain a fully corrected image of the shell assembly of the battery, for use in inspecting the shell assembly. For example, there is a weld bead on at least one of the two adjacent surfaces of the shell assembly in the depth image, and both of the two surfaces can be projected and mapped to the datum plane to obtain depth information of a corrected depth image, such that regardless of whether there is a weld bead on one of the surfaces or both surfaces, information of the weld bead on the surface or both surfaces can be obtained and the weld bead can be inspected based on the corrected depth image. In addition, in this embodiment, the datum plane is simple in terms of algorithm, which facilitates reducing the amount of computation and improving the efficiency of computation.

According to some embodiments of the present application, extracting the intersecting line from the depth image in S1002 may include the following steps.

In S10021, a point with the largest depth value in each row is extracted from the depth image.

With the depth image shown in FIG. 5(a) as an example, the depth image is obtained by a CCD line scan camera by performing scanning in an extension direction of the intersecting line 501, where an axis Y is parallel to a scanning direction of the depth image, which is a column direction of a pixel; an X axis is perpendicular to the scanning direction of the depth image, which is a row direction of the pixel; and each row of the depth image includes each row of pixel points parallel to the X axis. Each row of pixel points includes a point on an intersecting line, and the point on the intersecting line tends to have a larger depth value than those of other points. Therefore, a point with the largest depth value in each row is often the point on the intersecting line.

In S10022, an equation of a straight line for the intersecting line is obtained based on extracted points.

The point with the largest depth value in each row is often the point on the intersecting line, and points with the largest depth value in all rows are extracted to obtain a set of points. A intersecting line can be fitted through the set of points.

FIG. 11 is a schematic diagram of the principle of extracting an intersecting line from a depth image according to some embodiments of the present application.

The points on the intersecting line of the shell assembly tend to be higher than other points, and then the points on the intersecting line in the depth image tend to have a larger depth value than the values of the other points. Therefore, a set of points shown, for example, in FIG. 11(a) can be obtained by selecting points with the largest depth value in all rows from the image, an intersecting line and an equation of a straight line in which the intersecting line is located can be fitted based on the obtained set of points. For example, an equation 110 of a straight line for the intersecting line can be obtained based on processes shown in (b) and (c) of FIG. 11.

According to this embodiment, the process of extracting the intersecting line is simple, and the obtained equation for the intersecting line is relatively accurate. Therefore, a datum plane obtained based on the intersecting line can also be made relatively reliable, which facilitates improving the accuracy of correcting the depth image based on the datum plane.

According to some embodiments of the present application, obtaining an equation of a straight line for the intersecting line based on extracted points in S10022 may include analyzing the extracted points by using a principal component analysis (PCA) algorithm to obtain feature vectors, and obtaining the equation of the straight line based on the feature vectors.

For example, as shown in FIG. 11(a), due to noise in an image, there is an outlier (for example, white points in the figure) in the point with the largest depth value in each row that is extracted from the depth image. As a result, extraction results for the intersecting line are often unsatisfactory, making it difficult to directly obtain an equation of a straight line based on extracted set of points. In this embodiment, a PCA technique is used to analyze the extracted points. As shown in (b) of FIG. 11, the distribution of positions of all the extracted points (black points and white points) can be obtained after analysis made based on the PCA technique, and then an equation of a straight line in which an intersecting line is located can be obtained from a feature vector 120 corresponding to a larger feature value.

According to this embodiment, the equation of the straight line for the intersecting line is simple in terms of calculation mode, and the obtained equation for the intersecting line is relatively accurate. Therefore, a datum plane obtained based on the intersecting line can also be made relatively reliable, which facilitates improving the accuracy of correcting the depth image based on the datum plane.

According to some embodiments of the present application, extracting the intersecting line from the depth image in S1002 may further include the following step.

In S10023, it is determined whether the equation of the straight line obtained in S10022 meets a set condition, and if not, screening is performed on the points, and an equation of a straight line is re-obtained based on points remained after screening.

Exemplarily, determining whether the equation of the straight line meets the set condition can specifically involve determining whether the equation of the straight line is within an error range in respect of the slope and/or intercept of the equation of the straight line, that is, determining whether the set condition is met. If the slope and/or intercept of the equation of the straight line is within the error range, the set condition is met and the equation of the straight line can be output, otherwise screening is performed on the points, and an equation of a straight line is refitted based on points remained after screening. Exemplarily, the points remained after screening can also be fitted using the PCA technique, to obtain the equation of the straight line.

Exemplarily, after the equation of the straight line is refitted based on the points remained after screening, the determination of whether the obtained equation of the straight line meets the set condition can be continued in the manner of S10023, to determine whether there is a need to continue point screening and refitting of the equation of the straight line, and so on, until the obtained equation of the straight line meets the set condition (for example, the slope and/or intercept is within the error range), the cycle stops, and the equation of the straight line is output. In some other embodiments, the conditions for stopping the cycle further include the number of times of screening exceeding a set upper limit, or the remaining number of feature points being not sufficient for fitting the equation of the straight line using the PCA technique.

The refinement is carried out to screen out the outliers, such that a more accurate intersecting line can be finally obtained. For example, in FIG. 11, as shown in (b) of FIG. 11, a feature vector 120 is obtained based on points (including white outliers) extracted from the depth image by using the PCA technique, and there is a certain distance between the feature vector 120 and an intersecting line 110. Therefore, an intersecting line obtained based on the feature vector 120 has a certain deviation with a low accuracy. Through a screening process, the white outliers in FIG. 11(b) can be discarded, with only black points remained, as shown in FIG. 11(c), and the intersecting line 110 is refitted based on the remained black points by using the PCA technique. At this time, a more accurate intersecting line 110 is obtained.

Exemplarily, the screening conditions and the outliers that need to be discarded can be defined based on the direction of the feature vector and the mean of the points, and then an equation of a straight line is re-obtained based on the remaining points.

Figure 12:
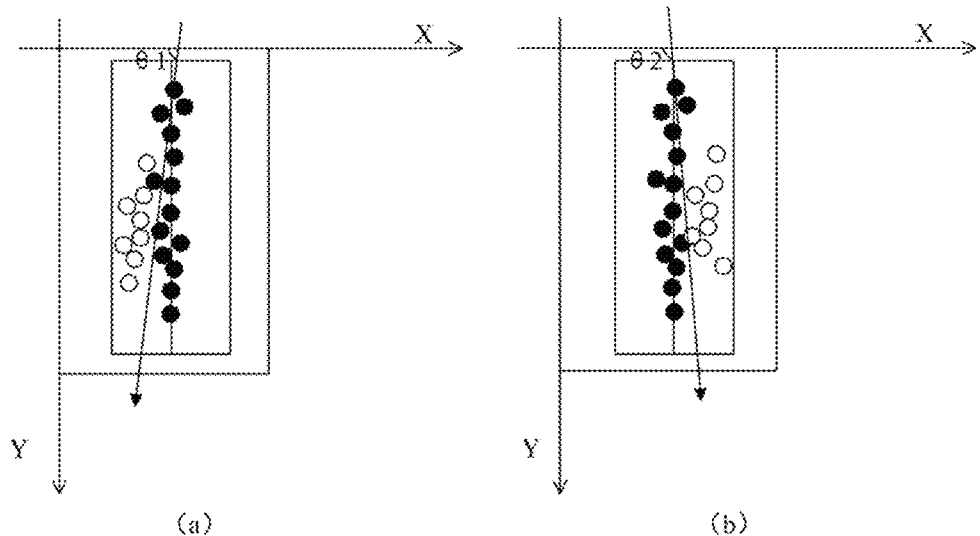
FIG. 12 is a schematic diagram of the principle of feature point screening according to some embodiments of the present application.

FIG. 12 is a schematic diagram of the principle of feature point screening according to some embodiments of the present application.

As shown in FIG. 12, the depth image has a pixel row direction that is parallel to the X axis, and the depth image has a pixel column direction that is parallel to the Y axis. For example, a set condition is that an inclination angle of an intersecting line with respect to the X axis is greater than or equal to 85° and less than or equal to 105°. If an included angle between a fitted intersecting line and the X axis is within this range, feature point screening is not performed. If the included angle between the fitted intersecting line and the X axis is out of this range, the outliers can be discarded based on a relationship between the straight line and the point.

In some embodiments, let an equation of a straight line fitted based on all feature points (points with the largest depth value in all rows) extracted from the depth image be $Y=K*X+bais$, where K is the slope, and bais is the intercept. Then, a screening condition can be set such that: points that satisfy $K*X+bais>Y$ are discarded, and points that satisfy $K*X+bais \leq Y$ are retained.

For example, in FIG. 12(a), an inclination angle θ1 of a straight line with respect to the X axis is less than 85°, which indicates that the set condition is not met and screening is needed. Then, white points in FIG. 12(a) can be discarded according to the above screening condition, with only black points remained after screening, and a more accurate intersecting line refitted based on the black points is obtained.

For example, in FIG. 12(b), an inclination angle θ2 of a straight line with respect to the X axis is greater than 105°, which indicates that the set condition is not met and screening is needed. Then, white points in FIG. 12(b) can be discarded according to the above screening condition, with only black points remained after screening, and a more accurate intersecting line refitted using the black points is obtained.

It should be noted that the set condition in this embodiment is merely an example, and the selection of the set condition is not limited thereto, but can be accomplished according to an actual photographing state and an obtained depth image. In addition, the screening method for feature points is also not limited to the above embodiments, and other screening methods can also be used to refine the feature points.

According to this embodiment, feature points can be further refined such that the accuracy of the feature points can be improved, and the accuracy of a fitted intersecting line can thus be improved.

According to some embodiments of the present application, the determining planes in the depth image in which the two adjacent surfaces are located in S1003 includes: determining the planes in which the two adjacent surfaces are located based on the equation of the straight line in which the intersecting line is located.

For example, as shown in FIG. 6, two surfaces in the depth image are located on either side of the intersecting line 601, the depth image can be easily split into two regions based on an equation of a straight line for the intersecting line 601, and then planes 602 and 603 in which the two surfaces are located are respectively fitted based on points in the two regions.

Of course, the method for determining the two surfaces is not limited to the use of the intersecting line, for example, it is also possible to determine the planes in which the two surfaces are located directly from the depth image. However, in contrast, this embodiment allows for the planes in which the two surfaces are located to be determined more easily and efficiently using the information of the intersecting line.

According to this embodiment, the planes in which the two surfaces are located can be obtained more easily, thereby further simplifying the entire depth image correction algorithm.

According to some embodiments of the present application, obtaining a datum plane based on the intersecting line and the planes in which the two adjacent surfaces are located in S1004 may include the following steps.

In S10041, feature vectors of the planes in which the two adjacent surfaces are located are calculated. For example, in FIG. 7(a), the two adjacent surfaces are respectively located in planes 702 and 703, the plane 702 has a feature vector V1, and the plane 703 has a feature vector V2.

Exemplarily, the two planes 702 and 703 in which the two surfaces are located can be respectively decomposed using a singular value decomposition (SVD) algorithm, to obtain the respective feature vectors V1 and V2 of the two planes 702 and 703.

In S10042, an equation for the datum plane is obtained based on the feature vectors of the planes in which the two adjacent surfaces are located and the equation of the straight line in which the intersecting line is located, where a normal vector to the datum plane is a sum of the feature vectors of the planes in which the two adjacent surfaces are located.

For example, in FIG. 7(a), the two adjacent surfaces are respectively located in planes 702 and 703, the plane 702 has a feature vector V1, and the plane 703 has a feature vector V2. Therefore, the normal vector to the datum plane is V=V1+V2. As shown in FIG. 7(b), the included angles ω1 and ω2 between the datum plane 700 obtained based on the normal vector V and the planes 702 and 703 in which the two surfaces are located are equal to each other. In some embodiments, when the planes 702 and 703 in which the two adjacent surfaces are located are perpendicular to each other, the included angles ω1 and ω2 between the datum plane 700 and the planes 702 and 703 in which the two surfaces are located are respectively equal to 45 degrees.

It can be understood that a plane can be obtained based on the normal vector V and any point on a straight line in which the intersecting line 701 is located, and the intersecting line 701 is located in the plane. For example, in FIG. 7, in some embodiments, the plane can be directly used as the datum plane 700.

In some other embodiments, for example, in FIG. 8, a normal vector V0 to a datum plane 800 is obtained based on feature vectors V3 and V4 of planes 802 and 803 in which two adjacent surfaces are located, and a plane 800a can be obtained based on the normal vector V0 and any point on a straight line in which an intersecting line 801 is located, where the intersecting line 801 is located within the plane 800a. The datum plane 800 can be obtained by adjusting a constant value of the plane 800a. The datum plane 800 is parallel to the plane 800a, and there is a set difference between constant values of the two planes.

Of course, the method for obtaining the datum plane based on the intersecting line and the planes in which the two adjacent surfaces are located is not limited to this embodiment. For example, it is also possible to first obtain angle bisecting planes for the two surfaces based on the two surfaces, and then obtain the datum plane based on the angle bisecting planes and the intersecting line. This can be specifically selected according to actual situations.

In this embodiment, the datum plane is simple in terms of calculation mode, which facilitates reducing the amount of computation and improving the efficiency of computation.

Figure 13:
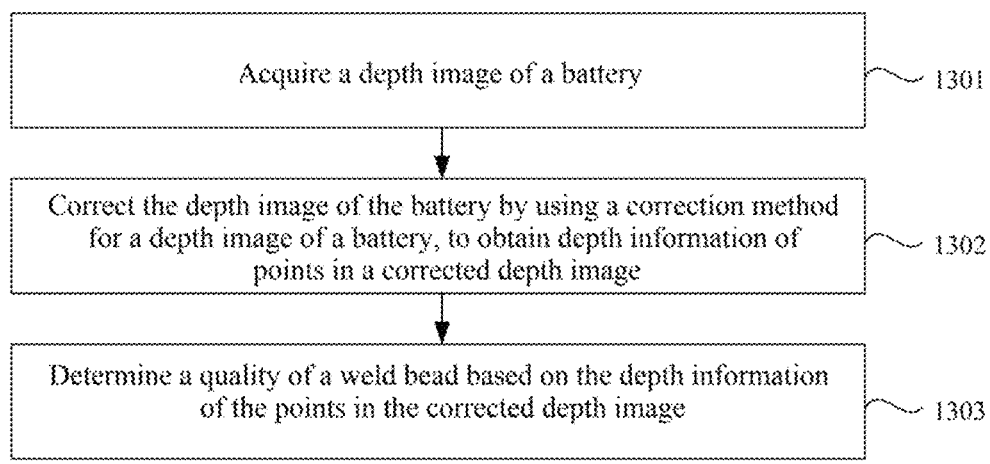
FIG. 13 is a flowchart of a method for welding inspection of a shell assembly of a battery according to some embodiments of the present application.

FIG. 13 is a flowchart 1300 of a method for welding inspection of a shell assembly of a battery according to some embodiments of the present application.

Some embodiments in a second aspect of the disclosure provide a method for welding inspection of a shell assembly of a battery. As shown in FIG. 13, the method includes the following steps.

In S1301, a depth image of a battery is acquired.

The battery includes a shell assembly, and the shell assembly includes a first portion and a second portion connected to each other by means of welding. For example, in FIG. 2, the first portion 21 and the second portion 22 of the shell assembly are respectively a top cover and a shell, and the first portion 21 and the second portion 22 are connected to each other by means of welding. For example, in FIG. 3, a plurality of weld beads 302a, 302b, 302c, and 302d are formed when the top cover and the shell are connected to each other by means of welding. When welding inspection is performed on the shell assembly, a depth camera is used to photograph each weld bead, for use in determining the quality of each weld bead.

For example, in FIG. 4, when a CCD line scan camera 41 is used to photograph one weld bead 402 on the shell assembly 40, the CCD line scan camera 41 performs scanning along an intersecting line 401 substantially parallel to the weld bead 402 to obtain the depth image of the shell assembly. The depth image obtained after scanning can be as shown in FIG. 5(a).

In some embodiments, the acquired depth image includes two adjacent surfaces of the shell assembly of the battery and an intersecting line between the two adjacent surfaces, and there is a weld bead for the first portion and the second portion on at least one of the two adjacent surfaces. For example, in FIG. 5(a), the depth image includes two adjacent surfaces 502 and 503 of the shell assembly and an intersecting line 501 between the two adjacent surfaces 502 and 503, and there is a weld bead (not shown) on one of the two adjacent surfaces 502 and 503. The weld bead is a weld bead formed by welding between the first portion and the second portion of the shell assembly.

It should be noted that the shell assembly of the battery is not limited to being formed by the shell and the top cover in FIG. 2, and can also be formed by a combination of two parts of a shell that have substantially the same shape. Correspondingly, the weld bead is not limited to being located on the top surface of the shell assembly, for example, the weld bead can also be located on a side of the shell assembly.

In S1302, the depth image of the battery is corrected using a correction method for a depth image of a battery of any one of the embodiments described above, to obtain depth information of points in a corrected depth image. The corrected depth image includes a weld bead.

In S1303, a quality of the weld bead is determined based on the depth information of the points in the corrected depth image.

In some embodiments, the quality of the weld bead is determined using a machine learning method.

In the technical solution of the present application, the depth image of the shell assembly of the battery is corrected such that deviations in the depth image caused by the deviation of a photographing state of a camera from a desired index can be avoided, which facilitates inspection of a weld bead of the shell assembly of the battery, and can improve the accuracy of inspection results for the weld bead of the shell assembly of the battery, for example, facilitating determinations of the quality of the weld bead based on a machine learning method and improving the accuracy of determination results. In addition, the technical solution of the present application provides a simple and effective correction algorithm, which can improve the efficiency of inspecting the weld bead of the shell assembly.

According to some embodiments of the present application, the acquiring a depth image of a battery in S1301 includes:
  photographing the depth image of the battery by means of a depth camera, where an image acquisition plane of the depth camera forms an inclination angle θ with at least one of the two adjacent surfaces of the shell assembly of the battery, and the inclination angle θ satisfies $30° \leq \theta \leq 60°$.

For example, in FIG. 4, the depth camera is a CCD line scan camera 41, and the image acquisition plane (target surface) 410 of the CCD line scan camera 41 faces an intersecting line 401 of the shell assembly 40, and has an inclination angle θ with a top surface of the shell assembly.

It can be understood that if an included angle θ between the image acquisition plane and one of the two adjacent surfaces is <30°, an included angle between the image acquisition plane and the other of the two adjacent surfaces is larger, and feature information (for example, a weld bead) on the other surface is not easily collected. In addition, even if the feature information can be collected, image information is obtained with large distortion, which makes it difficult to implement accurate analysis and inspection. If an included angle θ between the image acquisition plane and one of the two adjacent surfaces is >60°, feature information (for example, a weld bead) on this surface is not easily collected. In addition, even if the feature information can be collected, image information is obtained with large distortion, which makes it difficult to implement accurate analysis and inspection. In this embodiment, when the inclination angle θ satisfies 30°≤θ≤60°, it is conducive to taking both of the two adjacent surfaces into account, such that both of the two surfaces are photographed and acquired, and both of the acquired two surfaces are subjected to a relatively small image distortion, which facilitates inspection and analysis of feature information on the two surfaces.

It should be noted that the correction method for a depth image of a battery provided in the present application is not limited to being applied to inspection of the weld bead of the shell assembly, and may also be applied to inspection of the shell assembly in other aspects.

Figure 14:
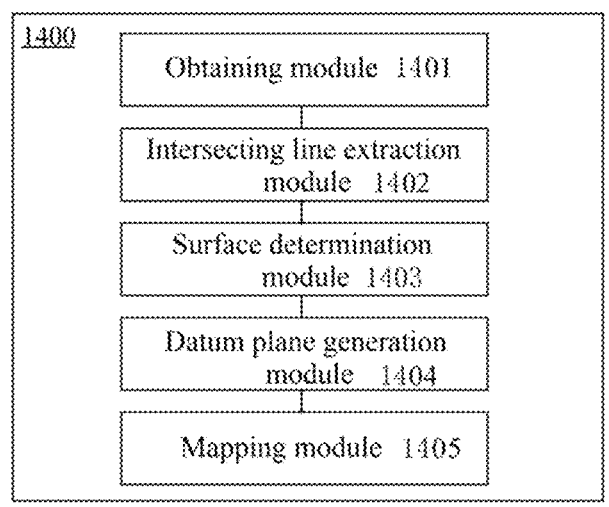
FIG. 14 is a structural block diagram of a correction apparatus for a depth image of a battery according to some embodiments of the present application.

FIG. 14 is a structural block diagram of a correction apparatus 1400 for a depth image of a battery according to some embodiments of the present application.

Some embodiments in a third aspect of the disclosure provide a correction apparatus 1400 for a depth image of a battery. As shown in FIG. 14, the apparatus 1400 includes:
- an obtaining module 1401 configured to obtain a depth image of a battery, where the depth image includes two adjacent surfaces of a shell assembly of the battery and an intersecting line between the two adjacent surfaces;
- an intersecting line extraction module 1402 configured to extract the intersecting line from the depth image;
- a surface determination module 1403 configured to determine planes in the depth image in which the two adjacent surfaces are located;
- a datum plane generation module 1404 configured to obtain a datum plane based on the intersecting line and the planes in which the two adjacent surfaces are located, where the datum plane is parallel to the intersecting line, and included angles between the datum plane and the planes in which the two adjacent surfaces are located are equal to each other; and
- a mapping module 1405 configured to project and map points in the depth image to the datum plane, to obtain depth information of points in a corrected depth image.

In the technical solution of the present application, a datum plane is fitted based on the depth image of the shell assembly of the battery, and the depth information of the depth image is corrected by taking the datum plane as the standard, such that deviations in the depth image caused by the deviation of a photographing state of a camera from a desired index can be avoided, which facilitates inspection of the shell assembly of the battery based on the image, and can improve the accuracy of inspection results for the shell assembly of the battery, for example, facilitating determinations of the quality of the weld bead of the shell assembly based on a machine learning method and improving the accuracy of determination results.

Moreover, in this embodiment, the fitted datum plane is parallel to the intersecting line, and the included angles between the datum plane and the two adjacent surfaces are equal to each other. In this way, both the intersecting line and the two adjacent surfaces in the depth image can be projected to the datum plane, such that the entire depth image can be corrected to obtain a fully corrected image of the shell assembly of the battery, for use in inspecting the shell assembly. For example, there is a weld bead on at least one of the two adjacent surfaces of the shell assembly in the depth image, and both of the two surfaces can be projected and mapped to the datum plane to obtain depth information of a corrected depth image, such that regardless of whether there is a weld bead on one of the surfaces or both surfaces, information of the weld bead on the surface or both surfaces can be obtained and the weld bead can be inspected based on the corrected depth image. In addition, in this embodiment, the datum plane is simple in terms of algorithm, which facilitates reducing the amount of computation and improving the efficiency of computation.

According to some embodiments of the present application, the intersecting line extraction module is configured to: extract a point with the largest depth value in each row from a 3D image, and obtain an equation of a straight line for the intersecting line based on extracted points.

According to this embodiment, the process of extracting the intersecting line is simple, and the obtained equation for the intersecting line is relatively accurate. Therefore, a datum plane obtained based on the intersecting line can also be made relatively reliable, which facilitates improving the accuracy of correcting the depth image based on the datum plane.

According to some embodiments of the present application, the intersecting line extraction module may analyze the extracted points by using a principal component analysis algorithm to obtain feature vectors, and obtain the equation of the straight line based on the feature vectors.

According to this embodiment, the equation of the straight line for the intersecting line is simple in terms of calculation mode, and the obtained equation for the intersecting line is relatively accurate. Therefore, a datum plane obtained based on the intersecting line can also be made relatively reliable, which facilitates improving the accuracy of correcting the depth image based on the datum plane.

According to some embodiments of the present application, the intersecting line extraction module is further configured to: determine whether the equation of the straight line meets a set condition, and if not, perform screening on the points, and re-obtain an equation of a straight line based on points remained after screening.

According to this embodiment, feature points can be further refined such that the accuracy of the feature points can be improved, and the accuracy of a fitted intersecting line can thus be improved.

According to some embodiments of the present application, the surface determination module is configured to determine the planes in which the two adjacent surfaces are located based on the equation for the straight line in which the intersecting line is located.

According to this embodiment, the planes in which the two surfaces are located can be obtained more easily, thereby further simplifying the entire depth image correction algorithm.

According to some embodiments of the present application, the datum plane generation module is configured to: calculate feature vectors of the planes in which the two adjacent surfaces are located; and obtain an equation for the datum plane based on the feature vectors of the planes in which the two adjacent surfaces are located and the equation of the straight line in which the intersecting line is located, where a normal vector to the datum plane is a sum of the feature vectors of the planes in which the two adjacent surfaces are located.

In this embodiment, the datum plane is simple in terms of calculation mode, which facilitates reducing the amount of computation and improving the efficiency of computation.

In addition, as with the correction method for a depth image of a battery according to the embodiments of the disclosure that is implemented in some embodiments and can bring about beneficial effects, the correction apparatus for a depth image of a battery according to the embodiments of the disclosure is implemented in the same or similar embodiments and brings about the same or similar beneficial effects, which will not be repeated here.

Some embodiments in a fourth aspect of the disclosure provide a control apparatus, which includes a memory, a processor, and a program stored on the memory and executable on the processor, where the program implements, when executed by the processor, the correction method for a depth image of a battery of any one of the embodiments described above.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: The systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Some embodiments in a fifth aspect of the disclosure provide a computer-readable storage medium storing a computer program that, when executed by a processor, implements the correction method for a depth image of a battery of any one of the embodiments described above.

The computer-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

Some embodiments in a sixth aspect of the disclosure provide a computer program product including a computer program that, when executed by a processor, implements the correction method for a depth image of a battery of any one of the embodiments described above.

Program codes used to implement the method of the disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented.

The correction method for a depth image of a battery according to some embodiments of the disclosure includes the following steps:

S1501, acquiring a depth image of a battery;

S1502, extracting a point with the largest depth value in each row from the depth image;

S1503, analyzing extracted points by using a PCA technique to obtain feature vectors, and obtaining an equation of a straight line based on the feature vectors;

S1504, determining whether the obtained equation of the straight line meets a set condition, and if not, performing screening on the points, and analyzing points remained after screening by using the PCA technique, to re-obtain an equation of a straight line; then, re-determining whether the obtained equation of the straight line meets the set condition, and if the obtained equation of the straight line does not meet the set condition, continuing to perform screening on the points, and repeating this process of making a determination on the obtained equation of the straight line, until the obtained equation of the straight line meets the set condition, or the number of times of screening exceeds a set upper limit, or the remaining number of points are not sufficient for fitting the equation of the straight line using the PCA technique;

S1505, determining planes in which two surfaces adjacent to an intersecting line are located based on the equation of the straight line, which satisfies the set condition, for the intersecting line that is obtained in S1504;

S1506, calculating feature vectors of the planes in which the two adjacent surfaces are located;

S1507, adding the feature vectors of the planes in which the two adjacent surfaces are located, to obtain a normal vector to the datum plane, and obtaining an equation for the datum plane based on the normal vector and the equation for the straight line in which the intersecting line is located, where the obtained datum plane is parallel to the intersecting line, and included angles between the datum plane and the planes in which the two adjacent surfaces are located are equal to each other; and S1508, projecting and mapping points in the depth image to the datum plane, to obtain a corrected depth image.

Finally, it should be noted that the above embodiments are merely used for illustrating rather than limiting the technical solutions of the present application. Although the present application has been illustrated in detail with reference to the foregoing embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A correction method for a depth image of a battery, comprising:
obtaining the depth image of the battery, wherein the depth image comprises two adjacent surfaces of a shell assembly of the battery and an intersecting line between the two adjacent surfaces;
extracting the intersecting line from the depth image;
determining planes in the depth image in which the two adjacent surfaces are located;
obtaining a datum plane based on the intersecting line and the planes in which the two adjacent surfaces are located, wherein the datum plane is parallel to the intersecting line, and included angles between the datum plane and the planes in which the two adjacent surfaces are located are equal to each other; and
projecting and mapping points in the depth image to the datum plane, to obtain depth information of points in a corrected depth image.

2. The method according to claim 1, wherein extracting the intersecting line from the depth image comprises:
extracting a point with a largest depth value in each row from the depth image; and
obtaining an equation of a straight line for the intersecting line based on extracted points.

3. The method according to claim 2, wherein obtaining the equation of the straight line for the intersecting line based on the extracted points comprises:
analyzing the extracted points by using a principal component analysis algorithm to obtain feature vectors, and obtaining the equation of the straight line based on the feature vectors.

4. The method according to claim 2, wherein extracting the intersecting line from the depth image further comprises:
determining whether the equation of the straight line meets a set condition; and
in response to the equation of the straight line not meeting the set condition, performing screening on the points, and re-obtaining an equation of a straight line based on points remained after screening.

5. The method according to claim 1, wherein obtaining the datum plane based on the intersecting line and the planes in which the two adjacent surfaces are located comprises:
calculating feature vectors of the planes in which the two adjacent surfaces are located; and
obtaining an equation for the datum plane based on the feature vectors of the planes in which the two adjacent surfaces are located and an equation of a straight line in which the intersecting line is located, wherein a normal vector to the datum plane is a sum of the feature vectors of the planes in which the two adjacent surfaces are located.

6. The method according to claim 1, wherein determining the planes in the depth image in which the two adjacent surfaces are located comprises:
determining the planes in which the two adjacent surfaces are located based on an equation of a straight line in which the intersecting line is located.

7. A method for welding inspection of a shell assembly of a battery, comprising:
acquiring a depth image of the battery, wherein the battery comprises the shell assembly, the shell assembly comprises a first portion and a second portion connected to each other by means of welding, the depth image comprises two adjacent surfaces of the shell assembly of the battery and an intersecting line between the two adjacent surfaces, and there is a weld bead for the first portion and the second portion on at least one of the two adjacent surfaces;
correcting the depth image of the battery by using the correction method according to claim 1, to obtain depth information of points in a corrected depth image; and
determining a welding quality of the weld bead based on the depth information of the points in the corrected depth image.

8. The method according to claim 7, wherein acquiring the depth image of the battery comprises:
photographing the depth image of the battery by a depth camera, wherein an inclination angle θ between an image acquisition plane of the depth camera and at least one of the two adjacent surfaces of the shell assembly of the battery satisfies $30° \leq \theta \leq 60°$.

9. A control apparatus, comprising:
at least one processor; and
a memory communicatively coupled to the at least one processor, wherein the memory stores instructions executable by the at least one processor, and the instructions, when executed by the at least one processor, cause the at least one processor to perform the correction method according to claim 1.

10. A non-transitory computer-readable storage medium storing a computer program that, when executed by a processor, implements the correction method according to claim 1.

* * * * *